United States Patent [19]
Pfenninger et al.

[11] 3,868,169
[45] Feb. 25, 1975

[54] OBSERVATION PERISCOPE WHICH CAN BE COMBINED WITH A LASER DEVICE

[75] Inventors: Heinz Pfenninger, Rumlang; Waldemar Strietzel, St. Gallen, both of Switzerland

[73] Assignee: Contraves AG, Zurich, Switzerland

[22] Filed: Feb. 9, 1973

[21] Appl. No.: 330,991

[30] Foreign Application Priority Data
Feb. 28, 1972  Switzerland.................... 2766/72

[52] U.S. Cl................... 350/26, 350/22, 350/52, 350/301, 356/3
[51] Int. Cl............................................ G02b 23/08
[58] Field of Search.......... 350/6, 7, 22, 24, 26, 52, 350/301; 356/3

[56] References Cited
UNITED STATES PATENTS
3,015,249  1/1962  Taylor.......................... 350/26 X
3,647,276  3/1972  Howell et al..................... 350/52 X Primary Examiner—Edward S. Bauer
Assistant Examiner—Matthew W. Koren
Attorney, Agent, or Firm—Werner W. Kleeman

[57] ABSTRACT

An observation periscope which can be combined with a laser distance measuring device, wherein at least one mirror located forwardly of the periscope objective is arranged to be rotatable about the optical axis of the periscope objective relative to a support and pivotable about the elevation axis. The infeed of the laser beam between the periscope objective and the mirror arranged forwardly thereof and into the latter occurs with the aid of two mirrors which are positively aligned relative to one another.

8 Claims, 3 Drawing Figures

1

OBSERVATION PERISCOPE WHICH CAN BE COMBINED WITH A LASER DEVICE

BACKGROUND OF THE INVENTION

The present invention relates to a new and improved construction of observation periscope which can be combined with a laser distance measuring device, wherein at least one mirror located ahead of the periscope objective is arranged to be rotatable about the optical axis of the periscope objective relative to a support and pivotable about the elevation axis.

In state-of-the-art anti-aircraft defense systems there are employed periscopes for monitoring the air space for aircraft, so-called scanning, and for following a sighted aircraft for the continuous determination of its positional coordinates, so-called tracking. In modern installations these scanning and directional functions are also simultaneously assumed by radar devices which in particular also carry out a distance measuring operation between the observer and the target. In a known construction of tank with an anti-aircraft defense system at least one optical periscope is mounted at the dome of the tank turret which can be unlimitedly rotated, and which when the radar distance measuring device is not useable, serves as an auxiliary sighting device having angle transmitters for determining and indicating the lateral angle and elevational angle of a sighted aircraft and supplying this information to a main computer or an auxiliary computer. By additionally setting an assumed firing distance it is possible to determine as an aid the firing parameters for firing at the sighted aircraft or fighting ground targets. In order to ensure for the exact determination of the distance data, even upon malfunction of the radar distance measuring device, there is mounted at the turret cover a laser distance measuring device incorporating a periscope which can be freely controlled laterally and elevationally and equipped with appropriate angle transmitters for the optimum monitoring of the spherical-shaped air space. Viewing through the periscope occurs with the aid of a mirror arranged ahead or forwardly of the periscope objective, this mirror being arranged to be rotatable about the optical axis of the periscope objective relative to the turret cover and pivotable about the elevational axis.

SUMMARY OF THE INVENTION

It is a primary object of the present invention to combine the laser device with the periscope in such a way that the laser beam is always aligned parallel to the optical viewing or sighting axis.

Now in order to implement this object, and others which will become more readily apparent as the description proceeds, the invention contemplates that the infeed of the laser beam between the periscope objective and the forwardly arranged mirror and into the latter occurs with the aid of two mirrors which are automatically or positively always aligned with respect to one another. If the laser transmitter, owing to its large volume, must be located at the position of the stationary component which is opposite the forwardly arranged mirror, then the mirrors which are automatically or positively aligned with respect to one another are preferably arranged in such a way that one of such mirrors is eccentrically rotatably mounted at the rotatable component and the other rotatably mounted at the support which is relatively stationary with respect thereto, and each such mirror is rotatable about an axis parallel to the optical axis of the periscope objective. Furthermore, the alignment of both mirrors occurs by means of a cable which is under tension and which is fixedly mounted at the support of the one mirror and displaceably guided at the support of the other mirror.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
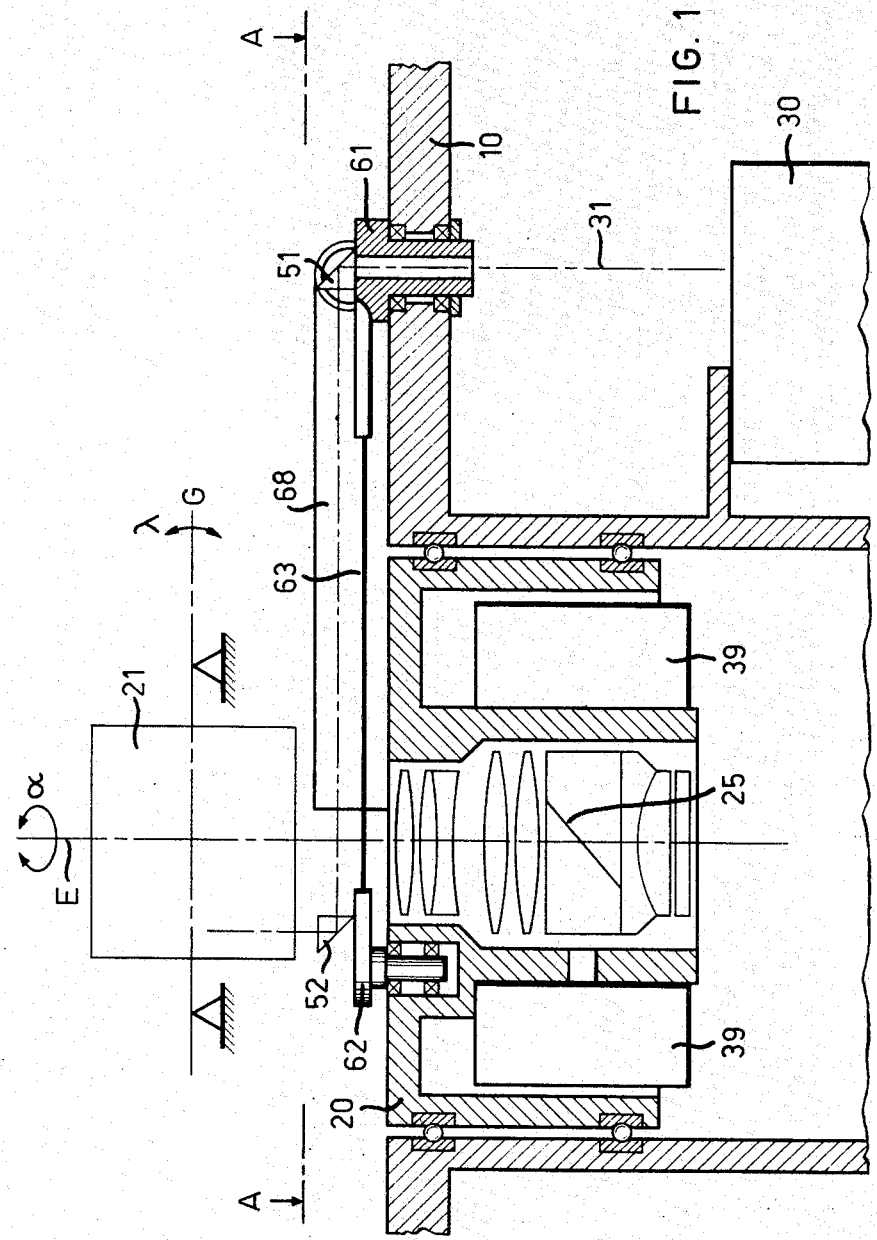
FIG. 1 is a schematic fragmentary view through a laser periscope arrangement designed according to the teachings of this invention.
Figure 2:
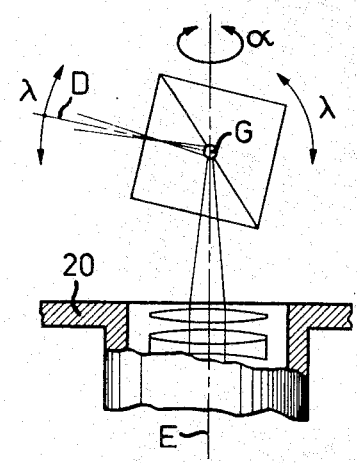
FIG. 2 is a fragmentary side sectional view through a portion of the system depicted in FIG. 1, for the purpose of clarifying the function of the mirror arranged ahead of the periscope objective.

Describing now the drawings, it is to be understood that only enough of the observation periscope which is combined with the laser device of the arrangement of this development has been depicted in the drawings to enable those skilled in the art to readily understand the underlying concepts. Hence, according to the showing of FIGS. 1 and 2 a periscope objective housing 20 and a pivotal prism member 21 which is appropriately rigidly connected for rotation therewith are rotatably mounted at a support or carrier 10 for rotation about the axis E in order to change the lateral angle $\alpha$ of the viewing or sighting axis D. The pivotal prism member 21 is pivotal about the horizontal axis G in order to be able to change the elevational or altitude angle $\lambda$ of the viewing axis D. In a manner conventional in this particular art, and therefore not specifically shown in the drawings, the remaining elements of the periscope, such as the inverting- and magnification lens system, the erection prism, the mirror prism, and the ocular are arranged so as to be fixedly connected with a support plate beneath the objective 20. Also as is well known in the art the control of the periscope can be undertaken by a servo-motor which has not been particularly shown since it is of standard design. At the support or carrier 10 there is arranged the rather voluminous or large size laser transmitter 30 and at the objective 20 the laser receiver 39 which is of considerably smaller volume. A laser beam 31 which is located in a direction parallel to the axis E is deflected by means of a prism mirror 51 parallel to the axis G and towards a second prism mirror 52. From the location of the second prism 52 the laser beam is delivered laterally and parallelly with respect to the axis E to the periscope prism mirror 21. The prism mirror 51 is supported to be rotatable, however free of play at the support 10 by means of a holder 61. The prism 52 is eccentrically arranged to be likewise rotatable and free of play at the rotatable objective housing 20 by means of a holder 62 and as best seen by referring to the exemplary arrangement of FIG. 1 such eccentric arrangement places the prism 52 out of the field of view of the lens and prism members of the periscope objective but within the field of view of the prism mirror 21.

Figure 3:
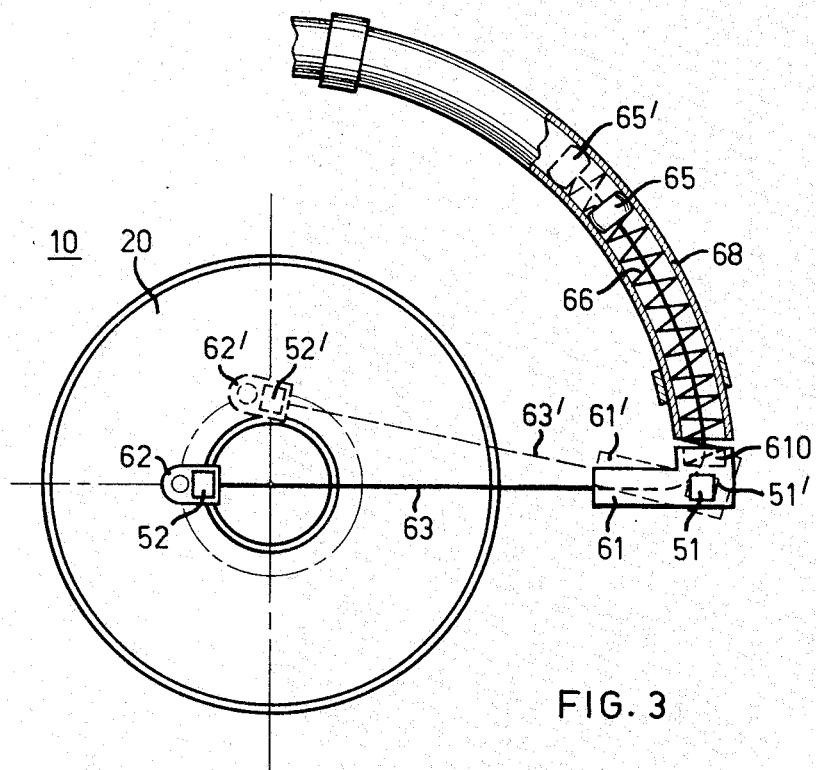
FIG. 3 is a plan view, partially in section, looking in the direction of the line A—A of FIG. 1.

In FIG. 3 there is illustrated the mechanism for automatically and positively aligning both of the prism mirrors 51 and 52. A cable or cord 63, or equivalent structure, for instance formed of highly flexible heddle wire of a thickness about 0.3 millimeters, and secured at one end of the holder 62 is displaceably guided at the holder 61 and deflected at a concentrically arranged tubular member 68 and a compression or pressure spring 66 which is displaceably arranged therein. The other end of the cable 63 and one end of the spring 66 are secured to a clamp 65 or equivalent structure. The other end of the compression spring 66 engages with a recess 610 at the holder 61. The cable 63 and the prism mirrors 51 and 52 are arranged at the holders 61 and 62 in such a manner that a connection line of the centers of rotation of the holders 61 and 62, the optical connection axis of the mirrors 51 and 52 and the cable 63 in plan view are located coaxially with respect to one another.

The laser beam 31 is now deflected through both of the prism mirrors 51 and 52 to the periscope mirror 21 and from that location radiated parallel to the viewing or sighting axis D. The laser beam is therefore aligned parallel to the light beam with the same lateral angle and elevational angle. A change in the lateral angle is realized in that the periscope objective housing 20 and therefore the prism mirror 21 is rotated relative to the support 10. The holder 62 is displaced in the direction of rotation through the same angle of rotation. For instance, the holder now referenced by reference numeral 62' portrays this new position. At this point it is remarked that hereinafter the same reference characters but employed with a prime marking are used to denote such new positions which the relevant components assume. Owing to the tension which is exerted by the compression spring 66 via the clamp 65' upon the cable 63' the holders 61' and 62' and therefore the prism mirrors 51' and 52' are aligned with respect to one another. Now from the location of the mirror 52' the laser beam is again aligned or directed upon the periscope mirror 21, so that, as a function of the position of the mirror 21, there is likewise again aligned the laser beam parallel to the light beam with the same lateral angle and elevational angle. If the laser beam impinges upon a target then a portion of the reflected beams, analogous to the light rays, is conducted via the prism mirror 21 into the objective and at the location conducted partially through the mirror 25 which is permeable to the light rays and into the laser receiver 39. The advantage of such arrangement resides primarily in the fact that the laser beam need not be conducted through the lens system of the objective, so that damage to such lens and its coatings is avoided and there is equally avoided losses in energy which exist owing to the great number of transistions.

It is also conceivable to only rotate the periscope mirror 21 about the axis E and to arrange such periscope mirror 21 so as to be pivotable about the axis G. With such arrangement the prism mirror 52 and its holder 62 must be rotatably arranged in the holder of the mirror 21. In the event that there is present at the rotatable component having the prism mirror 21 sufficient space for housing the laser transmitter 30 then both of the prism mirrors 51 and 52 could be rigidly secured in an aligned position at the rotatable component.

In the illustrated exemplary embodiment the control accuracy of both prisms for the most part is dependent upon the spring force and therefore can be controlled and adjusted.

While there is shown and described present preferred embodiments of the invention, it is to be distinctly understood that the invention is not limited thereto, but may be otherwise variously embodied and practiced within the scope of the following claims. Accordingly,

What is claimed is:

1. An observation periscope arrangement equipped with a periscope objective and capable of being combined with a laser distance-measuring device, comprising a periscope objective having an optical axis, a periscope support for mounting said periscope objective, mirror means having an elevational axis and disposed forwardly of the periscope objective, means mounting at least said mirror means to be rotatable about the optical axis of the periscope objective and relative to the periscope support and pivotable about said elevational axis of said mirror means, two mirrors cooperating with said mirror means, and means for aligning said two mirrors relative to one another for introducing a laser beam between the periscope objective and the forwardly arranged mirror means and into the latter.

2. The arrangement as defined in claim 1, said periscope objective having a field of view, said mirror means having a field of view, said two mirrors defining a first mirror and a second mirror, said aligning means including means for mounting said first mirror eccentrically with respect to the periscope objective externally of said field of view of said periscope objective and within the field of view of said mirror means.

3. The arrangement as defined in claim 2, said first mirror having a sighting axis, and said mounting means for said first mirror mounting said first mirror with its sighting axis substantially parallel to the optical axis of the periscope objective.

4. The arrangement as defined in claim 1, further including a rotatable component cooperating with one of said mirrors, said aligning means incorporating first means for eccentrically mounting said one mirror at said rotatable component and second means for rotatably mounting the other mirror at said periscope support, said first and second mounting means for said two mirrors mounting said two mirrors to be rotatable about a respective axis which is substantially parallel to the optical axis of the periscope objective.

5. The arrangement as defined in claim 4, wherein said rotatable component cooperates with said periscope support for rotatably mounted said periscope objective.

6. The arrangement as defined in claim 4, wherein said rotatable component constitutes part of said mounting means for said mirror means.

7. The arrangement as defined in claim 4, wherein said first and second mounting means for each of said two mirrors comprises a respective holder for each of said two mirrors, and said aligning means for said two mirrors further incorporates a cable which is under tension, said cable being fixedly mounted at the holder for one mirror and displaceably guided at the holder of the other mirror.

8. An observation periscope arrangement equipped with a periscope objective and capable of being combined with a laser distance-measuring device, comprising a periscope objective having an optical axis and a field of view, a periscope support for mounting said periscope objective, mirror means having an elevational axis and a field of view, said mirror means being disposed forwardly of the periscope objective, said mirror means having an elevational axis and a field of view, means mounting at least said mirror means to be rotatable about the optical axis of the periscope objective, two mirrors, means mounting said two mirrors so as to cooperate with said mirror means, said mounting means for said two mirrors including means for mounting one of said mirrors eccentrically with respect to the periscope objective externally of the field of view of the periscope objective and within the field of view of the mirror means.

* * * * *